Figure 1:
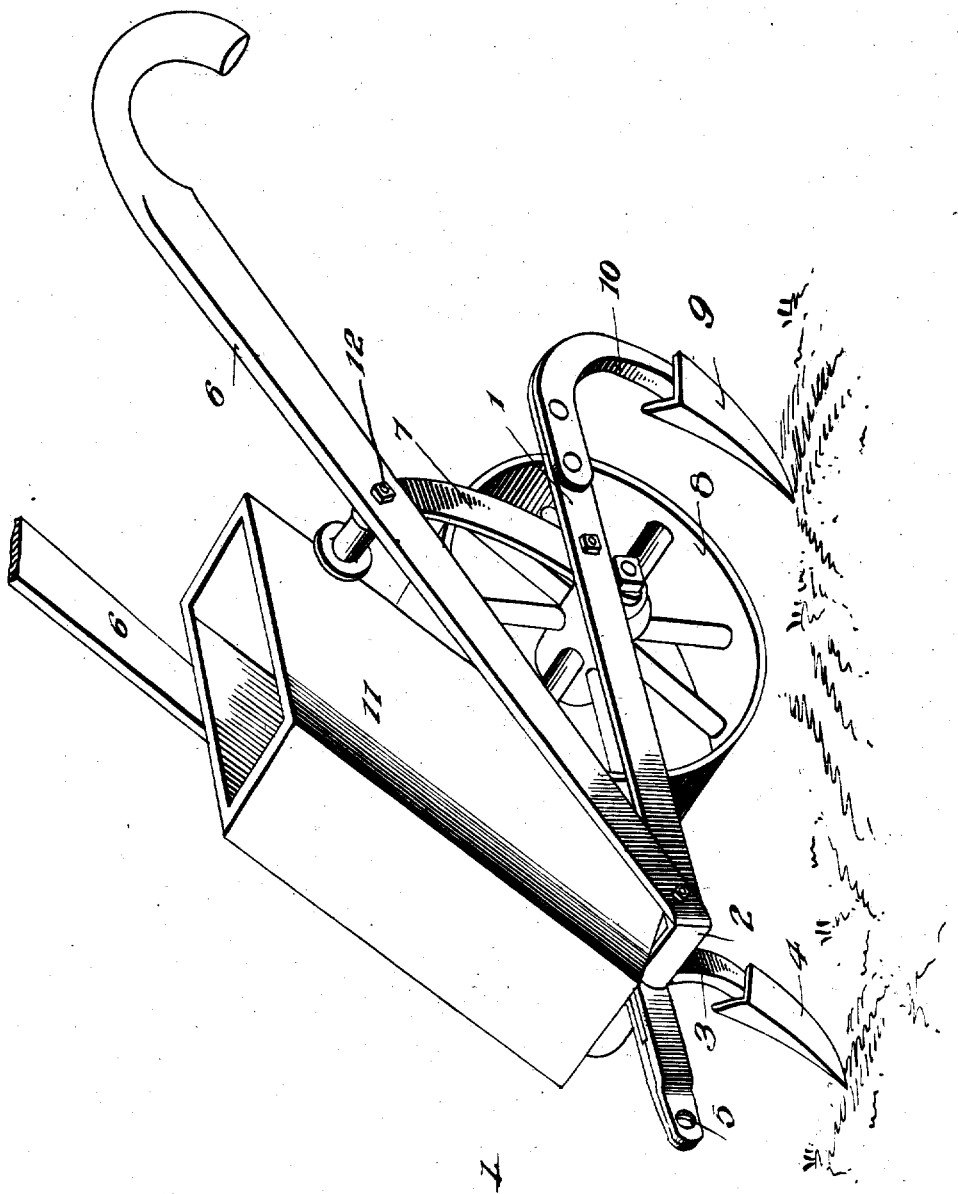

J. W. CRAWFORD.
COTTON PLANTER.
APPLICATION FILED JAN. 31, 1908.

901,072.

Patented Oct. 13, 1908.
2 SHEETS—SHEET 1.

Witnesses

Inventor
J. W. Crawford.

By
Lacey, Attorneys

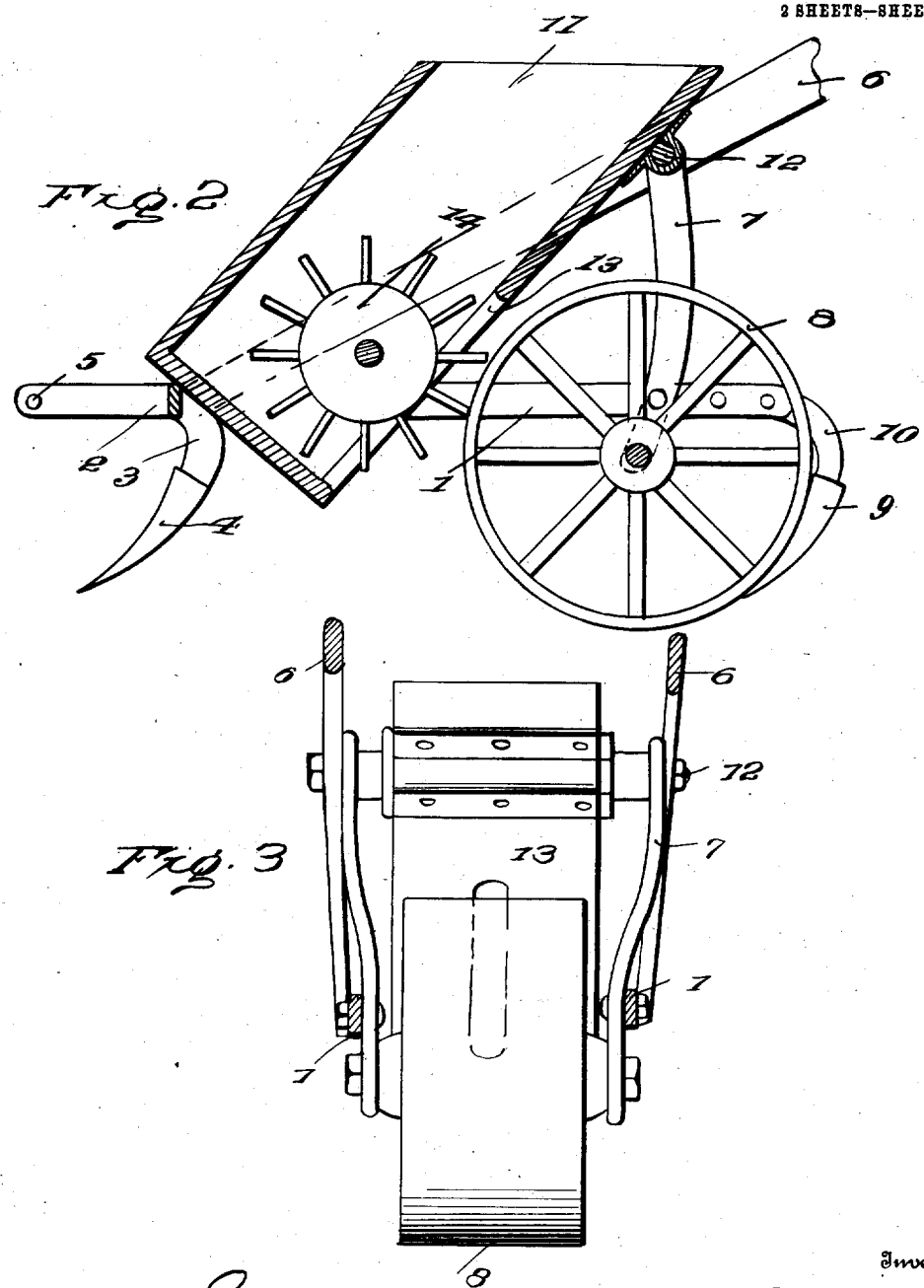

UNITED STATES PATENT OFFICE.

JOHN W. CRAWFORD, OF LAGRANGE, GEORGIA.

COTTON-PLANTER.

No. 901,072.   Specification of Letters Patent.   Patented Oct. 13, 1908.

Application filed January 31, 1908. Serial No. 413,668.

*To all whom it may concern:*

Be it known that I, JOHN W. CRAWFORD, citizen of the United States, residing at Lagrange, in the county of Troup and State of Georgia, have invented certain new and useful Improvements in Cotton-Planters, of which the following is a specification.

The present invention relates in general to agricultural implements and more particularly to an improved planter embodying novel means for controlling the discharge of the seeds from the hopper.

The object of the invention is to design a planter which is simple and inexpensive in its construction and operates in an effective manner to drop the seeds within the furrow in a uniform manner as desired.

For a full description of the invention and the merits thereof and also to acquire a knowledge of the details of construction and the means for effecting the result, reference is to be had to the following description and accompanying drawings, in which:

Figure 1 is a perspective view of a cotton planter embodying the invention. Fig. 2 is a vertical sectional view through the same. Fig. 3 is a rear view of the planter, parts being shown in section.

Corresponding and like parts are referred to in the following description and indicated in all the views of the drawings by the same reference characters.

The planter is designed more particularly for use in connection with cotton seeds, and comprises a frame formed of a pair of spaced and approximately parallel side pieces 1, the forward ends of the side pieces being deflected inwardly as indicated at 2 and secured to the upper end of the standard 3 having the furrow opener 4 applied thereto. It will also be observed that the inwardly deflected portions 2 of the side pieces are provided at their forward end with an opening 5 by means of which draft is designed to be applied to the planter. Handles 6 of the conventional construction extend upwardly and rearwardly from the forward portion of the side pieces 1 to which they are secured, and are held rigidly in position by means of the braces 7. These braces 7 are secured to the rear portions of the side pieces 1 and extend downwardly below the said side pieces, a supporting wheel 8 being journaled between the said downwardly projecting ends of the braces. This supporting wheel 8 is designed to travel in the furrow formed by the shovel 4, and the furrow is closed after the seeds have been dropped therein by means of the covering shovels 9 carried by standards 10 secured to the rear extremities of the side pieces 1.

A hopper 11 is pivotally mounted between the handles 6 and in the present instance upon a rod 12 connecting the braces 7 and also extending through the braces and forming a means for securing the handles thereto. When in normal position the hopper 11 is inclined downwardly and forwardly and the force of gravity tends to swing the same against the wheel 8. A discharge slot 13 is formed in the lower side of the hopper adjacent the bottom thereof and projecting through this discharge slot are the teeth of an agitator wheel 14 which is journaled within the hopper between the sides thereof. These teeth are designed to directly engage the supporting wheel 8 so that as the planter is drawn across the field motion is imparted from the supporting wheel to the agitator and as the latter rotates the teeth thereof engage the seeds within the hopper and cause the same to feed through the discharge slot 13 and drop into the furrow formed by the shovel 4 in the desired manner. After the seeds have been deposited within the furrow the covering shovels 9 throw the dirt back within the furrow so as to close the same. It will thus be apparent that as the planter is moved forwardly it will operate automatically to open the furrow, deposit the seeds therein at regular intervals, and close the furrow. It may also be mentioned that by merely swinging the hopper 11 upwardly about its pivotal connection with the rod 12 the teeth of the agitator wheel 14 will be moved away from the supporting wheel 8 and the device can then be moved from place to place without causing the seeds within the hopper to be fed through the discharge slot 13. In the preferred embodiment of the invention the agitator wheel is provided with twelve of the teeth 14, since such a construction has been found to give excellent results.

Having thus described the invention, what is claimed as new is:

1. In a planter, the combination of a frame, a supporting wheel journaled upon the frame, a hopper mounted upon the frame and provided with a discharge opening, and an agitator wheel journaled within the hopper and projecting through the discharge opening into engagement with the supporting wheel.

2. In a planter, the combination of a frame, a supporting wheel journaled upon the frame, a hopper pivotally mounted upon the frame above the supporting wheel and normally tending to swing against the latter, and an agitator wheel journaled upon the hopper and normally held in engagement with the supporting wheel from which it receives motion, the said agitator wheel controlling the discharge of seeds from the hopper.

3. In a planter, the combination of a frame, a supporting wheel journaled upon the frame, a hopper pivotally mounted upon the frame and formed with a discharge opening, and an agitator wheel journaled within the hopper and projecting through the discharge opening, the hopper normally tending to swing toward the supporting wheel to hold the agitator wheel in coöperative relation thereto.

4. In a planter, the combination of a frame, handles applied to the frame, a supporting wheel journaled upon the frame, a swinging hopper pivotally mounted upon the handles and provided with a discharge opening, and an agitator mounted within the hopper, the hopper having a tendency to swing toward the supporting wheel to hold the agitator normally in coöperative relation thereto.

5. In a planter, the combination of a frame formed with spaced side pieces, handles inclined upwardly and rearwardly from the forward ends of the side pieces, braces for the handles, a supporting wheel journaled between the spaced side pieces, a hopper pivotally mounted between the handles and normally tending to swing toward the supporting wheel, the said hopper having a discharge opening therein, an agitator wheel journaled within the hopper and provided with teeth projecting through the discharge opening and designed to engage the supporting wheel, a furrow opener at the forward end of the side pieces, and furrow closers at the rear ends of the side pieces.

In testimony whereof I affix my signature in presence of two witnesses.

JOHN W. CRAWFORD. [L. S.]

Witnesses:
J. M. HAYES,
R. M. YOUNG.